United States Patent
Senio et al.

(10) Patent No.: US 6,476,755 B1
(45) Date of Patent: Nov. 5, 2002

(54) COMMUNICATIONS JAMMING RECEIVER

(75) Inventors: Nicholas Senio, Bedford, MA (US); William H. Jeffrey, Nashua, NH (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 0 days.

(21) Appl. No.: 06/149,084

(22) Filed: Apr. 28, 1980

(51) Int. Cl.[7] .................................................. G01S 7/38
(52) U.S. Cl. .............................................. 342/15; 455/1
(58) Field of Search ................................. 455/1, 18, 73, 455/78, 79; 343/18 E; 342/13, 14, 15

(56) References Cited

U.S. PATENT DOCUMENTS 3,431,496 A * 3/1969 O'Donnell ...................... 455/1
4,017,856 A * 4/1977 Wiegand ........................ 455/1

* cited by examiner

Primary Examiner—John B. Sotomayor
(74) Attorney, Agent, or Firm—Daniel J. Long

(57) ABSTRACT

An improved communications jamming receiver is disclosed wherein time division multiplexing techniques are utilized that permit monitoring enemy radio frequency transmissions while in essence concurrently transmitting signals to jam selected enemy transmissions. The time division multiplexing alternately enables the communications receiver and a jamming transmitter at a frequency higher than the Nyquist rate of the threat signal being received to effectively continuously receive enemy transmissions while preventing reception of the jamming signals from the associated jammer transmitter. The multiplexing is carried on in a random fashion that prevents the enemy from determining the rate and transmitting during the period that the improved receiver is disabled.

8 Claims, 3 Drawing Sheets

COMMUNICATIONS JAMMING RECEIVER

FIELD OF THE INVENTION

This invention is directed to transmitter-receiver equipments and more particularly to techniques for time division multiplexing the transmitting and receiving functions.

In the prior art, military aircraft equipped with both communications jamming equipment and communications intelligence receiving equipment had to utilize one of these two types of equipment at a time. Typically, the jamming equipment has to be turned off for a sufficient amount of time to receive enemy radio frequency transmissions in order to determine which signals should be jammed. For voice signals the listening interval must be undesireably long, in the order of seconds to tens of seconds, to determine the nature of the message. This must be done because linguistic analysis cannot be performed any faster. Also, certain data link sync. intervals may be as long as a second or more. During such unacceptably long listening. intervals the enemy is able to achieve communications which may have many purposes including the particular purpose of defeating the mission of the aircraft.

One unacceptable technique that has been tried has been to receive while concurrently transmitting jamming signals. This has not worked due to the limited isolation between transmitting and receiving antennas on an aircraft.

Another technique in use is to deliberately feed back some of the transmitted signal to the receiver input but shifted in phase to attempt to cancel out energy coupled from the transmitting antenna to the receiving antenna. However, this technique has not resolved the problem satisfactorily.

Thus, there is a need in the communications jamming art for apparatus and techniques that effectively provide full time receiving as well as full time jamming of enemy signal transmission

SUMMARY OF THE INVENTION

This need in the prior art is satisfied by our invention in which we utilize sampling techniques to effectively listen to and analyze received enemy transmissions while at the same time jamming same. More specifically, we utilize one or more search receivers to locate and analyze transmission to determine which received signals should be Jammed. However, these receivers only sample received signals at or above the Nyquist rate of the target signal's modulation. The samples are applied to sample-and-hold circuits which-supply the missing energy during the periods the receivers are turned off. The sampling intervals occur at a rate such that the original modulation may be reconstructed. With the receivers used, an 85% jam duty cycle is obtained. What is, the receivers are utilized 15% of the time, typically thirty microseconds out of a two hundred microsecond interval, and while the receivers are disabled the jamming transmitter is energized. As the transmitter is typically energized for one hundred seventy microseconds out of each two hundred microsecond period, the jamming is essentially and effectively continuous. The effectiveness of the jamming is not impaired at all and the operator may listen to received signals as long as required, something that cannot be done with prior art systems wherein the transmitter sometimes has to disable for many seconds when received voice signals are being analyzed. The two hundred microsecond sample period is sampling at a five kilohertz rate which allows good reconstruction of speech and most other waveforms of interest for communications jamming.

BRIEF DESCRIPTION OF THE DRAWINGS

The invention will be better understood upon reading the detailed description in conjunction with the drawings in which.

DETAILED DESCRIPTION

Figure 1:
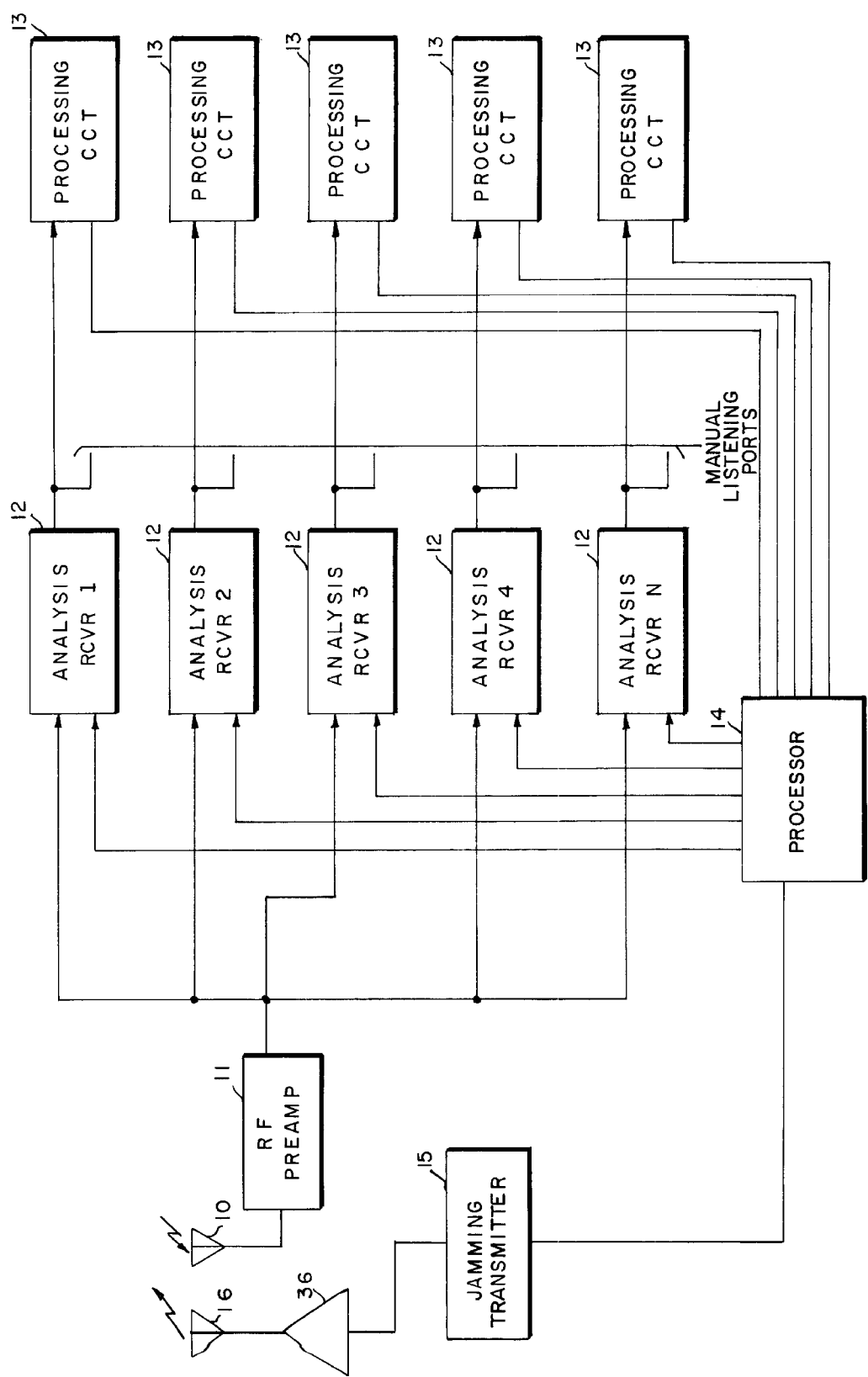
FIG. 1 is a general block diagram of a jamming system utilizing analysis receivers equipped in accordance with the teaching of our invention.

In FIG. 1 is shown a general block diagram of a jamming system. A group of analysis receivers 12 are controlled by a computer or processor 14 to tune to a multitude of signals of interest received via antennas 10 and RF preamplifier 11. Signals received via analysis receivers 12 are then analyzed with corresponding ones of processing circuits 13 which determine a variety of information regarding the transmitter. Processing circuits 13 may be under the control of processor 14 and also pass information regarding the received signals to processor 14. In response to information received from processing circuits 13 processor 14 controls jamming transmitter 15 to transmit jamming signals via power amplifier 36 and antenna 16. The finer details of the operation of a jamming system such as shown in FIG. 1 are well known in the art and are not described in detail herein.

Figure 2:
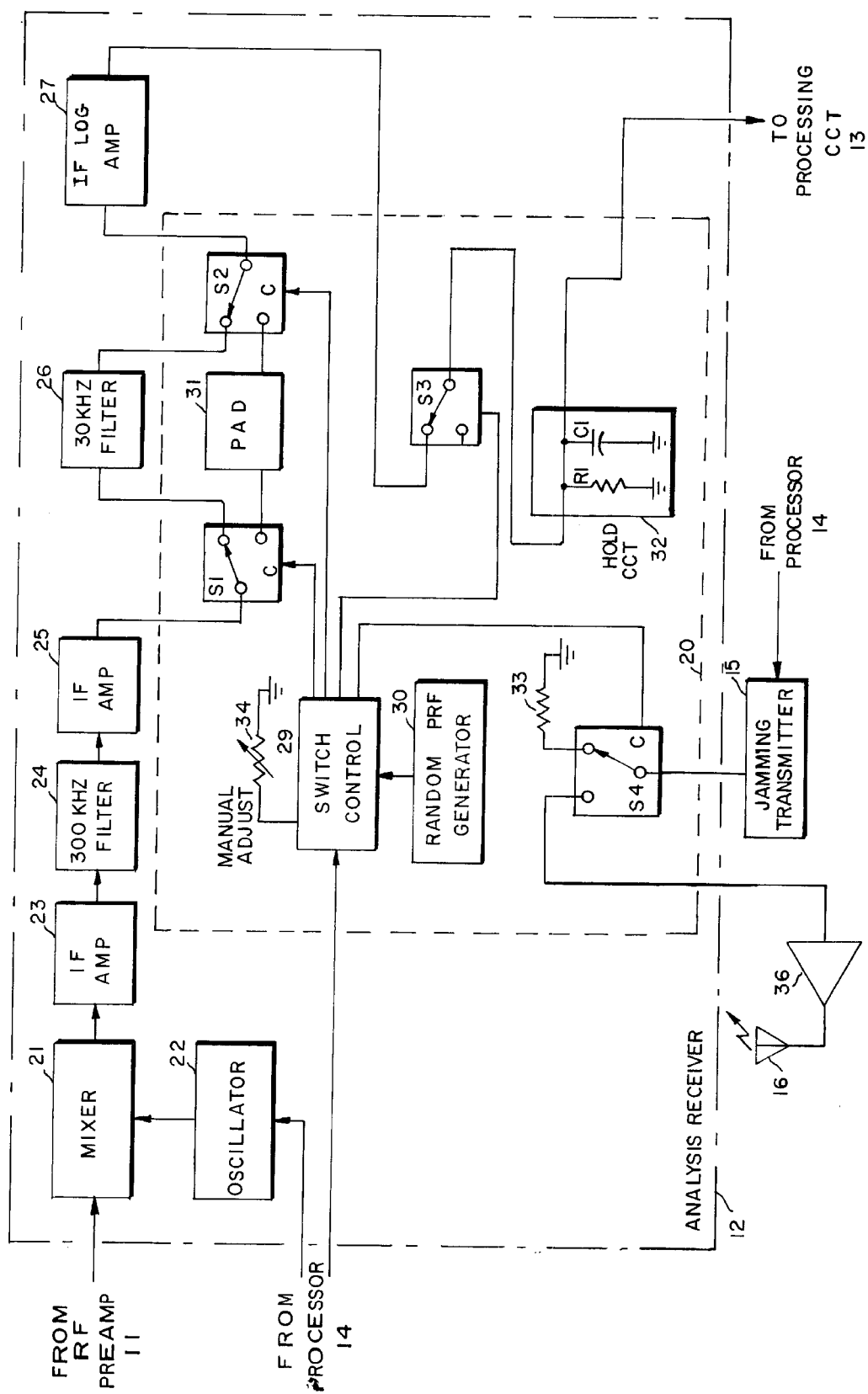
FIG. 2 shows a detailed block diagram of one of the analysis receivers modified in accordance with our invention showing how the receiver and the jamming transmitter are alternately enabled to provide the sampling function.

Turning now to FIG. 2, therein is a more detailed block diagram of one of analysis receivers 12 modified to operate in accordance with the teaching of our invention. In the prior art signals input to receiver 12 from RF preamplifier 11 are applied to mixer 21 which also has an input thereto from oscillator 22. This mixing stage converts the received RF signal to an intermediate frequency (IF) in a manner well known in the art. Processor 14 controls the frequency of oscillator 22 to determine the frequency to which analysis receiver 12 is tuned to receive signals.

Received signals which are converted to an intermediate frequency by mixer 21 are applied through an IF chain of IF amplifier 23, 300 KHz filter 24, IF amplifier 25 and 30 KHz filter 26 to log IF amplifier 27. Amplifier 27 provides logarithmic compression of high amplitude signals in a manner well known in the art. Amplifier 27 is a logarithmic for frequency modulated received signals and is a standard linear intermediate frequency amplifier for amplitude modulated received signals. In either case, the received signal is also detected in amplifier 27 to remove the intermediate frequency component. The IF output of log amplifier 27 is then applied via switch S3 to hold circuit 32 to derive the waveform of the received signal. The detected received signals are then applied to the associated processing circuit 13 for the processing briefly outlined heretofore.

The paragraphs above describe the means in which the prior art receiver operates. During jamming transmissions receiver 12 must be disabled, and during signal reception transmitter 15 must be disabled. This mode of operation is the problem in the prior art, for during listening periods enemy communications occur as no jamming signals are transmitted. Utilizing that circuitry shown in FIG. 2 that was not mentioned in the last paragraph of the analysis receiver operation description, in accordance with the present invention, transmission of jamming signals may continue while the analysis receivers are utilized.

To accomplish jamming while listening, processor 14 controls receiver 12 and transmitter 15, as hereinafter described in detail, to relatively rapidly enable and then disable both the receiver and transmitter such that the receiver is enabled while the transmitter is disabled and vice versa. For example, out of every 200 microsecond period the receiver is enabled for 30 microseconds and disabled for 170 microseconds. Conversely, the transmitter is disabled during the same 30 microseconds and enabled for the 170 microseconds. This is a jam duty cycle of eighty-five percent. During the first 10 microseconds of the 30 microsecond receiving period there is a delay before analysis to allow switching transients to fade away. This 200 microsecond period is a 5 KHz sampling of received signals and is presently satisfactory for both voice and data link signals. All that is necessary is to take sufficient samples to satisfy the Nyquist, criterion. As the data frequency increases the sampling rate can be increased to satisfy the Nyquist criterion. Depending upon the particular signal or signals to be jammed the jam duty cycle may be increased or decreased.

In this manner communications may effectively be continuously jammed while at the same time the same communications transmissions are monitored and analyzed. This solves the problem in the prior art.

It can be recognized that one way to defeat such a jamming arrangement would be to transmit only during the receiving periods of an analysis receiver modified and operating in accordance with the teaching of our invention. To avoid such a countermeasure processor 14 randomly varies the transmitting and receiving periods such that the Nyquist criterion is still met but the jamming effect is not countered.

Another consideration in utilizing our novel arrangement is ground return of transmitted jamming signals when our invention is utilized aboard an aircraft. It is the exact same problem that arises when radar pulse ground return falls within the radar range gate and this problem is well understood in the art. To circumvent this problem with an analysis receiver utilizing our invention the transmit jam duty cycle is varied. The higher the aircraft the shorter is the jam duty cycle. Thus, at an altitude of 25,000 feet the jam duty cycle must be decreased to 60%, or 120 microseconds out of every 200 microsecond period. This is the only practical approach where it is desired to listen and jam at the same frequency. A better alternative is to jam on one frequency while listening on other frequencies. More particularly, jamming transmissions should be confined to frequencies other than the frequencies being analyzed for approximately 50 microseconds prior to the receiving interval.

Jamming while listening using our invention also lends itself to voice actuated jamming which is the most efficient form of voice jamming. Jamming signals are transmitted only when the carrier is modulated by voice. Pauses and other breaks in voice are sensed by processor 14 which uses the time to jam other signals. When voice modulation is again detected processor 14 again starts jamming. Time shared jamming of four voice channels can be accomplished with excellent results and more voice channels can be jammed depending on many factors including jam duty cycle, percentage of modulation, signal levels, relative distance to threat transmitter and receiver, and available peak jammer power.

Turning now to FIG. 2, we describe the operation of the circuit modifications to analysis receiver 12 to implement our invention. Switches S1, S2, S3 and S4 controlled by processor 14 are inserted between transmitter 15 and its power amplifier 36; between logarithmic IF amplifier 27 and hold circuit 32; between IF amplifier 25 and 30 kilohertz filter 26, and between 30 kilohertz filter 26 and logarithmic IF amplifier 27. Switches S1 through S4 must change state very rapidly so are diode switches. However, diode switches produce a broadband noise transient upon being switched as a result of rapid redistribution of charge in the switching diode. Accordingly, the first 10 microseconds of each 30 microsecond receiving period are ignored by processing circuit 13 to let switching transients fade away. In addition, a sample and hold circuit consisting of switch S3 and hold circuit 32 is connected to the output of log amplifier 27. The log amp operating at IF, effectively detects the modulation on the IF signal. FM signals may be handled by replacing the log amp with a normal IF amplifier and FM detector. Processor 14 controls switches S1 through S4 by applying control signals to switch control 29 which in turn generates the driving signals that operate switches S1, S2, S3 and S4. Switch control 29 also receives signals from random pulse repetition frequency (PRF) generator 30 and responds thereto to vary the basic period in which receive and transmit cycles are accomplished to prevent the enemy from determining exact timing. of receive and jam cycles and then transmitting during the receive periods to sneak transmissions through.

During the receive cycle switches S1, S2, S3 and S4 are in the positions shown in FIG. 2 and the signals pass through receiver 12 to processing circuit 13. At the same time switch S4 grounds the output of jamming transmitter 15 to disable it. The output of transmitter 15 is grounded before any power amplification by amplifier 36 to avoid turning transmitter 15 on and off which causes switching transient problems. The value of resistor 33 equals the input impedance of power amplifier 36 to match impedance and prevent power reflection problems.

When switch control 29 operates switches Sr through S4 to disable receiver 12, switches S1 and S2 connect pad 31 into the IF circuit in lieu of 30 kilohertz filter 26. Pad 31 dissipates any signal energy passing through the front end circuits 21 through 25 of analysis receiver 12. In addition, most of the gain in the receiver is ahead of this point so that any switching transients caused by switches S1 and S2 are not amplified and thereby are not as troublesome. In this manner the circuits are not switched on and off causing transient problems but receiver 12 is effectively disabled. Switch S3 breaks the connection between logarithmic IF amplifier 27 and hold circuit 32.

Hold circuit 32 provides the reconstituted modulation that is on the threat signal, if the received signal samples occur often enough.

Figure 3:
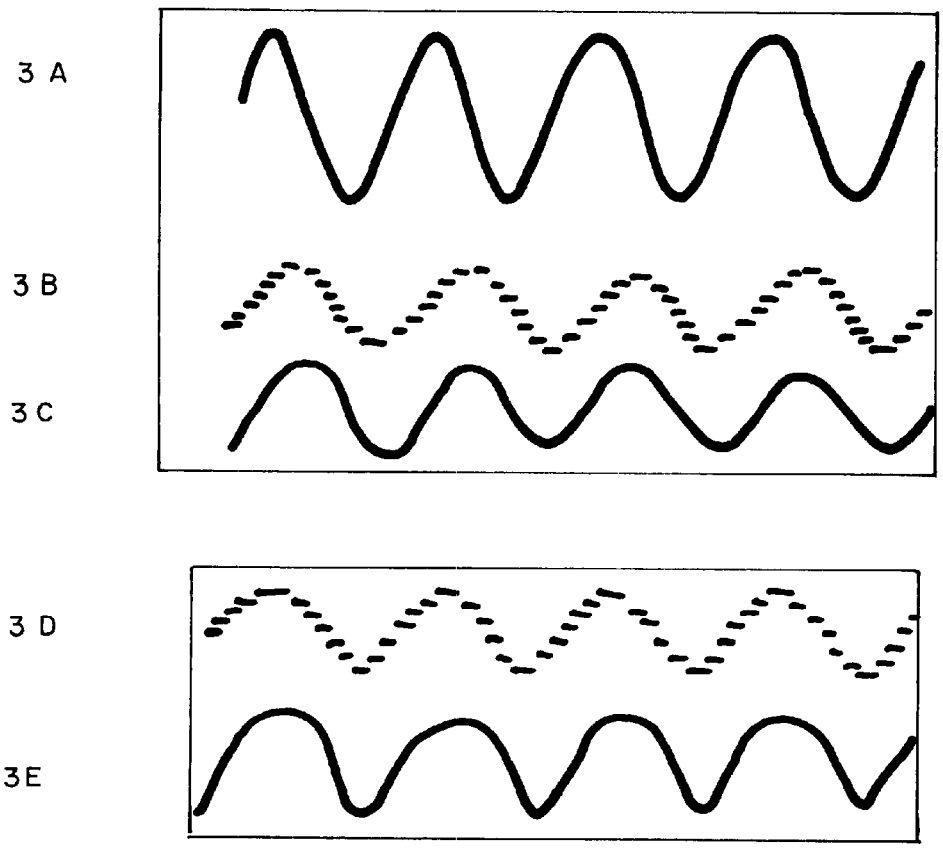
FIGS. 3A through 3E show waveforms that help to understand the sampling operation of the receiver.

Turning now to FIGS. 3A through 3E, therein are shown waveforms within analysis receiver 12 operating in accordance with the teaching of our invention. FIG. 3A shows a 400 cycle signal used to modulate the RF signal input to receiver 12. FIG. 3B shows the sampled signal at the output of logarithmic IF amplifier 27 for 30% modulation of the received carrier. FIG. 3C shows the filtered signal at the output of hold circuit 32 for the 30% modulation received signal which filtered signal is then applied to processing circuit 13. FIG. 3D shows the sampled signal at the output of logarithmic IF amplifier 27 for 70% modulation of the received carrier. Finally, FIG. 3E shows the filtered signal at the output of hold circuit 32 for the 70% modulation received signal.

While what has been described herein is the preferred embodiment of our invention, it will be obvious to one skilled in the art that many changes may be made while remaining within the scope of the invention. It is therefore desired that the protection afforded by Letters Patent be limited only by the true scope of the appended claims.

What we claim is:

1. An apparatus for alternating the reception of an enemy signal and the transmission of a jamming signal on the same or a different frequency, the repetition rate of the receiving intervals being sufficiently high to allow utilization of the intelligence carried by the received signal while the direction of the received interval is sufficiently short so that the transmitted jamming signal appears continuous to the enemy, said device comprises:

first switching means for periodically alternating the intervals in which the receiver is enabled and intelligence is withdrawn from the signal, with the intervals in which the receiver is in a disabled state;

second switching means for periodically alternating the intervals in which the transmitter is enabled to jam the enemy signal with the intervals in which the transmitter is disabled so that said first means is enabled when said second means is disabled and said first means is disabled when said second means is enabled;

switch control means for operating said first and second switching means above the Nyquist rate of the intelligence used to modulate the radio received signal; and sample and hold means having the demodulated receiver output intelligence signal periodically applied thereto as said receiver is enabled by said first switching means, said sample and hold means operating to effectively reconstruct the intelligence signal used to modulate the signal received by the receiver; and means for controlling said switch control means to continually vary the periods said first and said second switch means are operated to prevent the enemy from knowing or predicting the periods in which the transmitter is disabled.

2. The apparatus in accordance with claim 1 wherein said first switch means and said second switch means comprises transistor switches.

3. The apparatus in accordance with claim 2 wherein said first switch means is located in the receiver and coupled to the receiver oscillators to enable and disable the receiver's oscillators.

4. The apparatus in accordance with claim 1 wherein said first switch means and said second switch means comprise high speed diode switches.

5. The apparatus in accordance with claim 4 wherein said first switch means is located in said receiver after most radio frequency amplifier stages so that switching transients caused by operating said first switch means are not amplified to an unacceptable level.

6. The apparatus in accordance with claim 5 wherein said switch control means operates said second switch means to disable said transmitter a short period before operating said first switch means to enable said receiver to thereby prevent switching transients from said second switch means from adversely affecting said receiver.

7. The apparatus in accordance with claim 4 wherein said second switch means is located to interrupt said jamming signals in said transmitter before high power amplifier stages therein.

8. A method for alternating the reception of a received enemy signal and the transmission of a jamming signal on the same or a different frequency, the repetition rate of the receiving intervals of the received signal being sufficiently high to allow utilization of the intelligence carried by the received signal while the duration of the received interval is sufficiently short so that the transmitted jammed signal appears continuous to the enemy, said method comprising the steps of:

periodically switching said transmitter between an enabled state wherein it is jamming, and a disabled state wherein said transmitter is not jamming, periodically switching said receiver between an enabled state where it is obtaining intelligence samples and a disabled states where it is not obtaining intelligence samples at a frequency greater than the Nyquist rate for the intelligence received by said receiver, said disabled states occurring when said transmitter is enabled, said enabled state being when said transmitter is disabled, storing said intelligence samples produced when said receiver is enabled in a sample-and-hold circuit to produce an output which reconstructs the original signal used to modulate the radio frequency carrier received by said receiver, and randomly varying the periods that said receiver and said transmitter are switched between their enabled and disabled states.

* * * * *